US008348447B2

(12) United States Patent
Mirica et al.

(10) Patent No.: US 8,348,447 B2
(45) Date of Patent: Jan. 8, 2013

(54) PLASTIC CANOPY LOCK

(75) Inventors: Viorel Mirica, Brossard (CA); Kelley McAlpine, Laval (CA)

(73) Assignee: Thomas & Betts International, Inc., Wilmington, DE (US)

( * ) Notice: Subject to any disclaimer, the term of this patent is extended or adjusted under 35 U.S.C. 154(b) by 346 days.

(21) Appl. No.: 12/848,457

(22) Filed: Aug. 2, 2010

(65) Prior Publication Data

US 2011/0023339 A1 Feb. 3, 2011

Related U.S. Application Data

(60) Provisional application No. 61/230,895, filed on Aug. 3, 2009.

(51) Int. Cl.
*G06F 13/12* (2006.01)

(52) U.S. Cl. ........................ 362/97.4; 362/408; 362/655

(58) Field of Classification Search ................. 362/97.1, 362/97, 4, 147, 148, 150, 217.08, 217.16, 362/222, 249.01, 249.02, 249.016, 362, 365, 362/368, 370, 374, 396, 404, 408, 432, 652, 362/655, 812; 40/541, 564, 570

See application file for complete search history.

(56) References Cited

U.S. PATENT DOCUMENTS 3,931,689 A 1/1976 Shine
4,419,717 A 12/1983 Price et al.
4,426,126 A 1/1984 De Vos et al.
5,272,605 A 12/1993 Johnstone
5,376,020 A 12/1994 Jones
5,461,550 A 10/1995 Johnstone
5,526,251 A 6/1996 Andre et al.
5,727,867 A 3/1998 Johnstone
5,735,498 A 4/1998 Jue et al.
5,797,673 A 8/1998 Logan et al.
5,964,051 A * 10/1999 Loeber et al. .................. 40/570
6,082,031 A 7/2000 Heaton et al.
6,132,070 A 10/2000 Vosika et al.
6,457,270 B1 10/2002 Stark, III et al.
7,014,332 B2 3/2006 Sergio et al.
7,220,014 B2 5/2007 Lay et al.
7,350,327 B1 4/2008 Logan et al.
7,753,552 B2 7/2010 Mirica et al.

OTHER PUBLICATIONS

Emergi-Lite, Premier Series—Thermoplastic LED Exit Sign AC, AC/DC or Self-Powered, www.emergi-lite.com, Mar. 2008, 750. 1372 Rev. A.

Emergi-Lite, X30 Series—Thermoplastic Exit Sign with Power Pack Self Powered Incandescent, Fluorescent and LED models, www.emergi-lite.com, Jan. 2006, 750.0028 Rev. J.

* cited by examiner

*Primary Examiner* — Hargobind S Sawhney

(74) *Attorney, Agent, or Firm* — Hoffmann & Baron, LLP

(57) ABSTRACT

A sign-type lighting fixture assembly is provided herein. The assembly includes an illuminating lighting fixture, a canopy, and a canopy lock. The lighting fixture has a housing with a perimetrical wall. The perimetrical wall includes a fixture opening therein. The canopy secures the lighting fixture to the canopy. The canopy has a canopy opening for passage of electrical wires. The canopy further includes a pair of inwardly deflectable fingers for insertion into the fixture opening for resilient securement to the perimetrical wall of the lighting fixture. The canopy lock is configured to be inserted into the canopy opening. The canopy lock is disposed between the pair of deflectable fingers of the canopy to prevent inward deflection of the fingers of the canopy to prevent removal from the lighting fixture.

20 Claims, 12 Drawing Sheets

PLASTIC CANOPY LOCK

CROSS-REFERENCE TO RELATED APPLICATIONS:

This application claims priority to U.S. Provisional Application No. 61/230,895, filed Aug. 3, 2009, which is incorporated herein by reference.

FIELD OF INVENTION

The present invention relates generally to a lighting fixture assembly of the type used to support signage, such as an emergency exit sign. More particularly, the present invention relates to a separable lock configured to be easily inserted into a lighting fixture assembly and configured to secure a lighting fixture to a canopy.

BACKGROUND

The need for illuminated signage, such as exit signs, in buildings and other public areas is well known. These signs typically include lighting fixtures having a housing which support internal illumination for illuminating a sign supported by the housing. These fixtures are usually mounted in elevated locations by use of a canopy.

In common installation, a canopy is secured to the lighting fixture. The canopy is then attached to the electrical box, which typically includes a mounting plate attached thereto. The canopy and mounting plate allow for attachment of the fixture to an electrical box in either a ceiling or a wall. Additionally, the canopy and mounting plate allow the passage of electrical wires therethrough to supply power to the illuminating means in the lighting fixture. Many of these fixtures, including the canopy, are formed from sheet metal steel or plastic.

A prior art assembly includes a canopy configured to attach to a lighting fixture using deflectable fingers. The canopy with deflectable fingers is then secured to the housing mechanically using a screw. As these sign-type lighting fixtures are typically installed in elevated locations, they are often awkward to access. It can be appreciated that the installer needs to employ installing screws and tools, such as screwdrivers, while also wiring the fixture to the electrical box. The installation process is difficult and time consuming.

It is therefore desirable to provide a lighting fixture assembly including a lock which may be inserted into a canopy and prevent the deflectable fingers from deflecting inwardly after the lighting fixture assembly is installed. Additionally, it is desirable to provide a lock which secures the canopy to the lighting fixture without the use of tools or separate fastening hardware, such as a screw.

SUMMARY OF THE INVENTION

A sign-type lighting fixture assembly is provided herein. The assembly includes an illuminating lighting fixture, a canopy, and a canopy lock. The lighting fixture has a housing with a perimetrical wall. The perimetrical wall includes a fixture opening therein. The canopy lock secures the lighting fixture to the canopy. The canopy has a canopy opening for passage of electrical wires. The canopy further includes a pair of inwardly deflectable fingers for insertion into the fixture opening for resilient securement to the perimetrical wall of the lighting fixture. The canopy lock is configured to be inserted into the canopy opening. The canopy lock is disposed between the pair of deflectable fingers of the canopy to prevent inward deflection of the fingers of the canopy; hence, securing the connection between the canopy and the lighting fixture.

A method of attaching a sign-type lighting fixture to an electrical box is provided herein. First, a canopy is affixed to an illuminating lighting fixture having a housing with a perimetrical wall. The perimetrical wall includes a fixture opening therein. The canopy has a canopy opening for passage of electrical wires and at least one pair of inwardly deflectable fingers for insertion into the fixture opening for resilient securement to the perimetrical wall of the lighting fixture. Next, the canopy is secured to the lighting fixture by inserting a canopy lock into the canopy opening between the at least one pair of deflectable fingers of the canopy. The canopy lock prevents inward deflection of the at least one pair of deflectable fingers of the canopy; hence, securing the connection between the canopy and the lighting fixture. Then, the canopy is affixed to the electrical box.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF DRAWINGS

The present invention provides an assembly for quickly and securely attaching an illuminating lighting fixture to a canopy using a canopy lock. The type of illuminating lighting fixtures contemplated include, but are not limited to, an illuminated exit sign, an emergency lighting fixture, and an illuminated combination exit sign and emergency lighting fixture. The present invention further provides a method for assembly including the steps of attaching the canopy to an illuminating lighting fixture and securing the canopy to the lighting fixture by inserting the canopy lock into the canopy.

Figure 1:
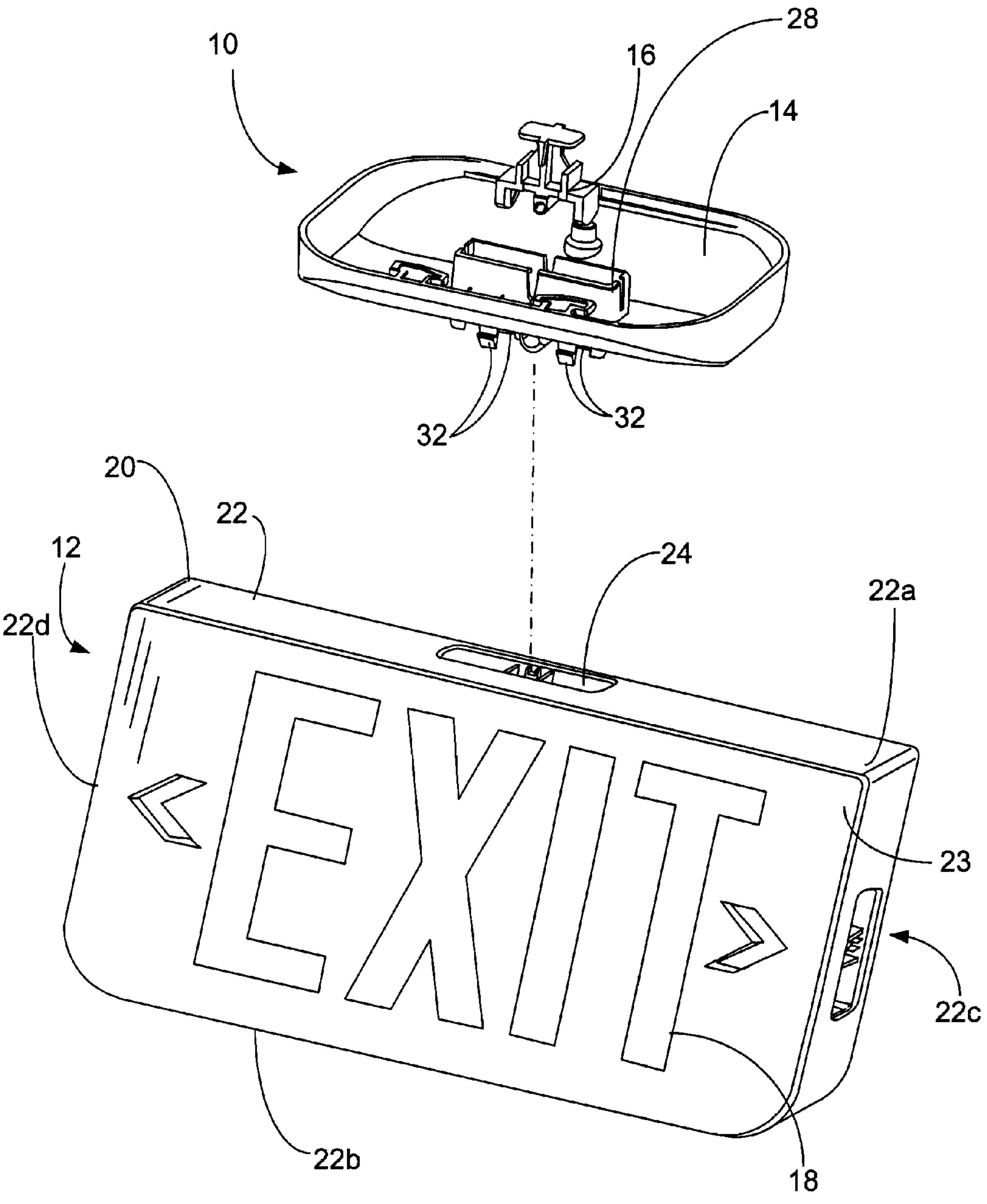
FIG. 1 shows a lighting fixture assembly of the present invention prior to installation.
Figure 1A:
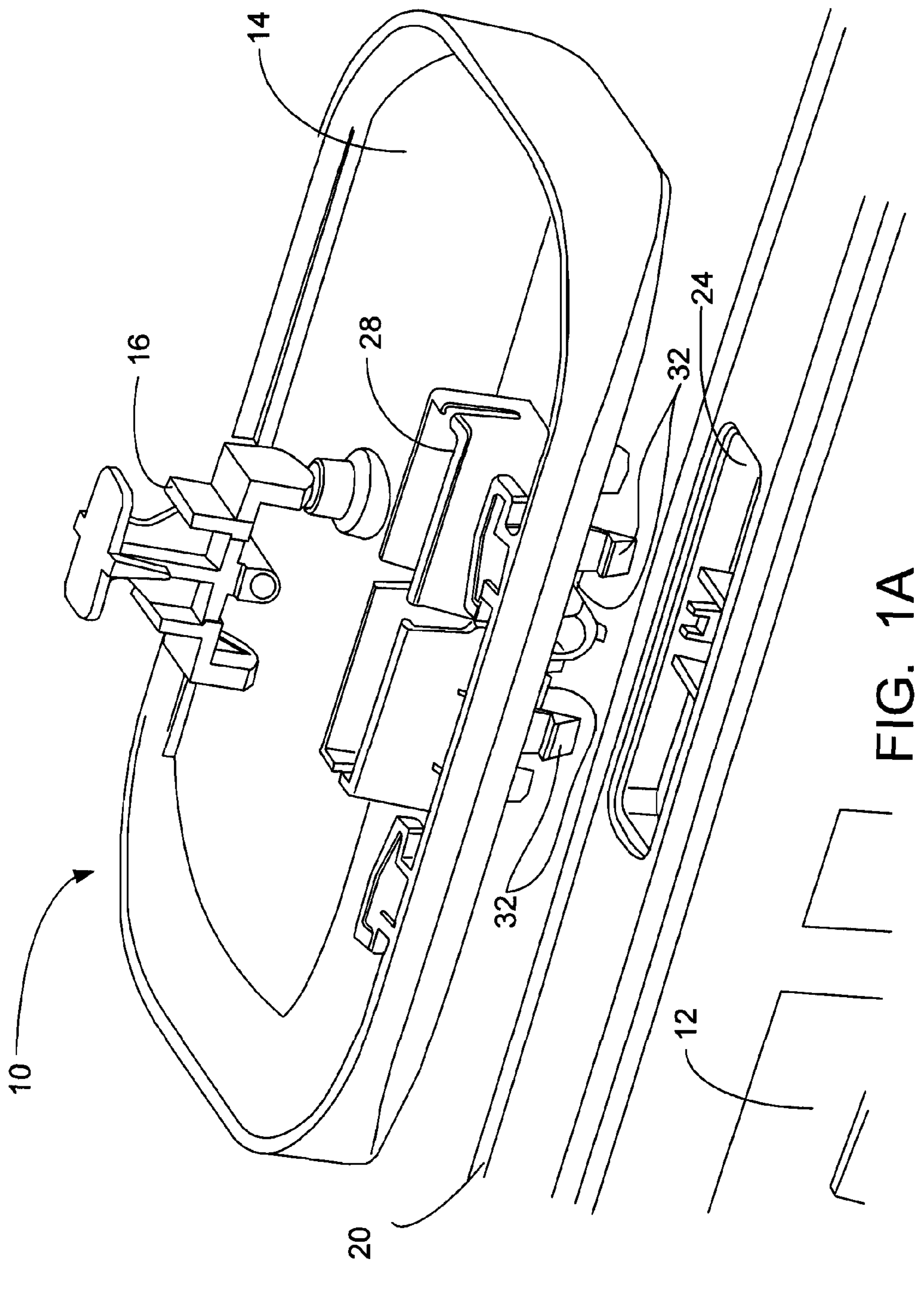
FIG. 1A shows an enlarged view of the lighting fixture assembly of FIG. 1.

FIGS. 1 and 1A show a lighting fixture assembly 10 of the present invention. The assembly 10 includes, a lighting fixture 12, a canopy 14, and a canopy lock 16. The assembly 10 permits the lighting fixture 12 to be attached to the canopy 14 and then mounted to an electrical box (not shown) located on a wall or ceiling.

The lighting fixture 12 is an illuminated sign 18, well known in the art, typically having a housing 20 with a perimetrical wall structure 22, including top 22*a*, bottom 22*b*, and opposing side walls 22*c*, 22*d*. The perimetrical wall structure 22 defines a generally rectangular configuration. The perimetrical wall structure 22 supports a front signage 23 and a back signage (not shown), which typically have a translucent or opaque character allowing for the sign 18 to be appropriately back lit. The housing 20 supports illuminating elements (not shown), which support back light illumination for signage.

The lighting fixture 12 has a fixture opening 24 centrally located on one of the perimetrical walls 22*a*. The fixture opening 24 allows passage of electrical wires from the fixture 12 to the electrical box. The fixture opening 24 is further configured for attachment of the fixture 12 to the canopy 14. FIGS. 1 and 1A show the fixture opening 24 on the top wall 22*a*, but the fixture opening 24 may also be on one of the side walls 22*c*, 22*d*.

Figure 2A:
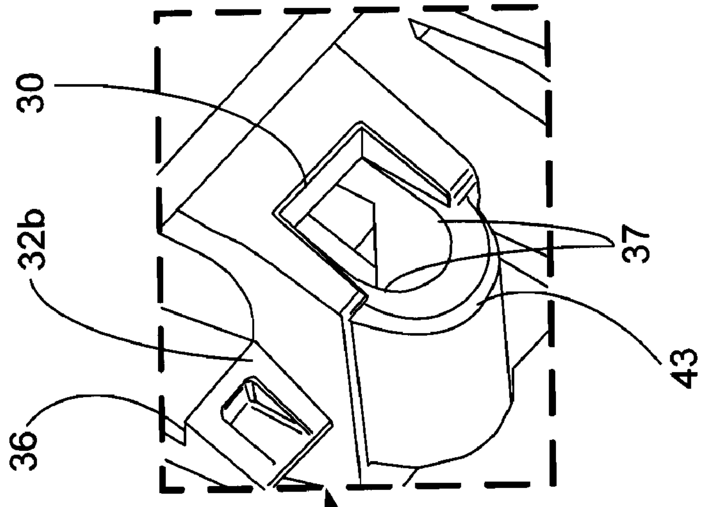
FIG. 2A shows an enlarged view of a portion of the canopy of FIG. 2.
Figure 2:
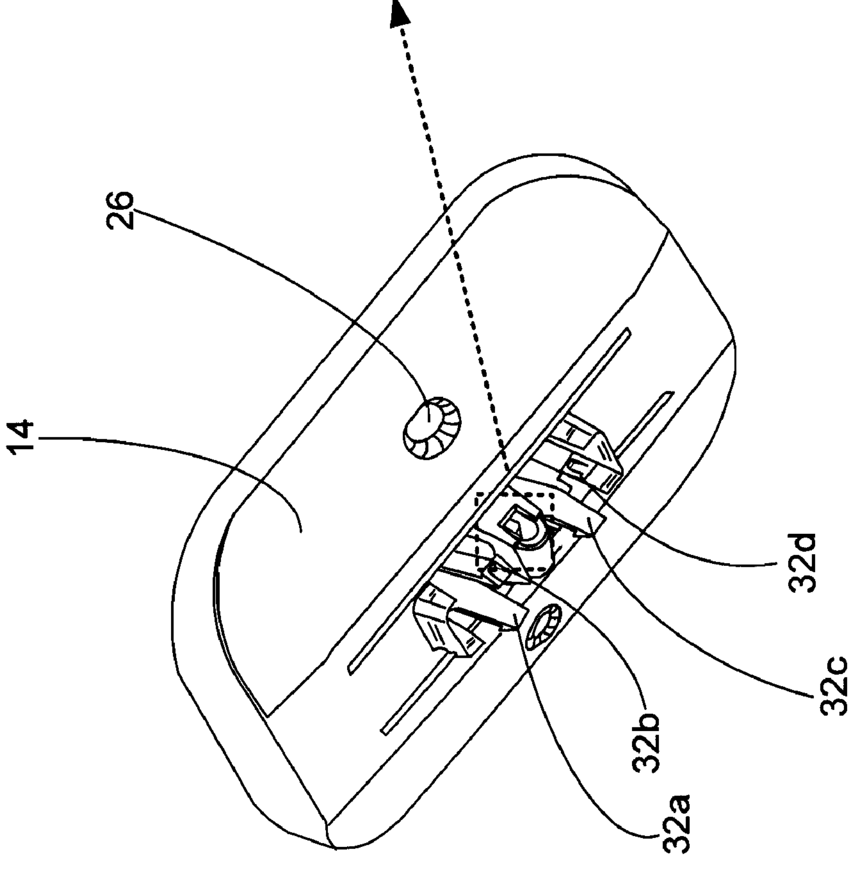
FIG. 2 shows a bottom view of a canopy for the lighting fixture assembly of the present invention.
Figure 3:
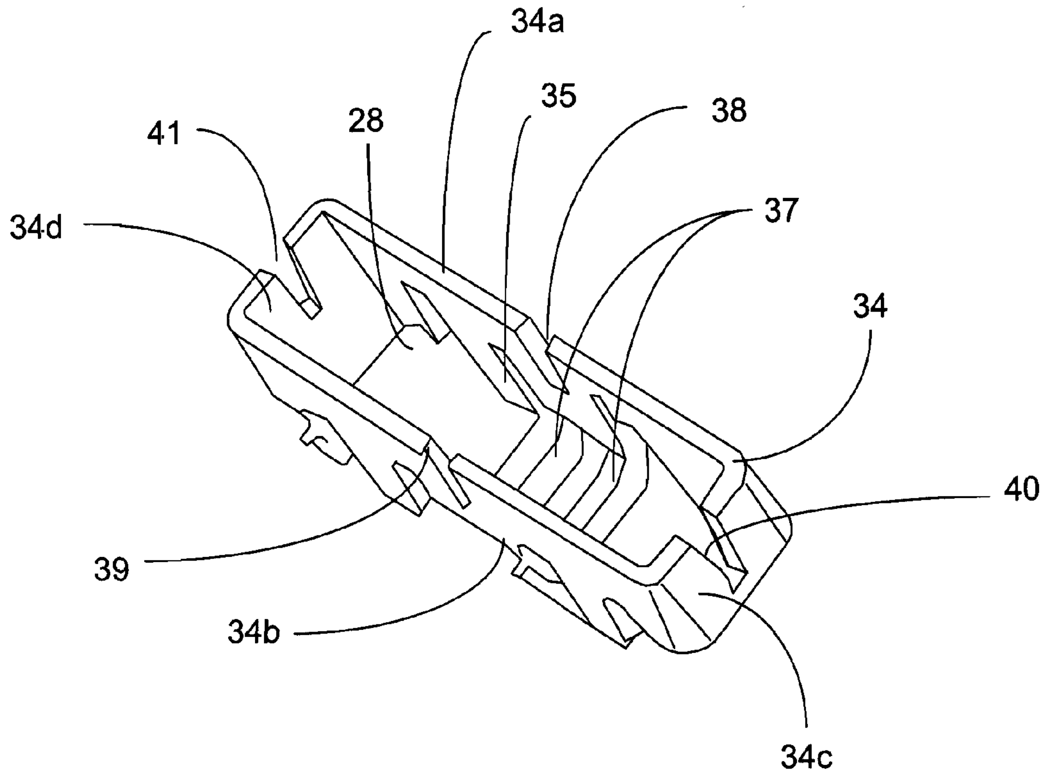
FIG. 3 shows an enlarged top view of a portion of the canopy for the lighting fixture assembly of the present invention.

Referring to FIGS. 2, 2A, and 3, the canopy 14 is shown. The canopy 14 is designed for attachment to the lighting fixture 12. The canopy 14 may be plastic or metal. The canopy 14 is of a typical configuration known in the art that attaches to an electrical box in a wall or ceiling. The canopy 14 may include one or more canopy screw holes for mechanically attaching the canopy 14 to the electrical box via the mounting plate. The canopy 14 shown herein includes one canopy screw hole 26.

The canopy 14 includes a canopy opening 28, a pair of receiving notches 30, and at least one pair of deflectable fingers 32. The canopy opening 28 shown in FIG. 3 is rectangular in shape and is bounded by a canopy wall structure 34 with four depending canopy walls 34*a*, 34*b*, 34*c*, 34*d*. The canopy opening 28 allows for the passage of the electrical wires to the electrical box. The canopy opening 28 is further configured to receive the canopy lock 16.

The pair of receiving notches 30 extend vertically from opposing canopy walls 34*a*, 34*b* of the canopy opening 28. The pair of receiving notches 30 are configured to engage with the canopy lock 16 and hold the canopy lock 16 in place.

The at least one pair of deflectable fingers 32 extend vertically from the canopy opening 28 with one of the deflectable fingers 32*a*, 32*b*, 32*c*, 32*d* in each pair of deflectable fingers 32 extending from opposing canopy walls 34*a*, 34*b* of the canopy opening 28. The at least one pair of deflectable fingers 32 are configured for inward deflection and snap attachment to the housing 20 of the lighting fixture 12. Each deflectable finger 32*a*, 32*b*, 32*c*, 32*d* further includes a ledge surface 36 projecting therefrom. The ledge surface 36 provides additional engagement with the housing 20 of the lighting fixture 12. The canopy may further include an inner surface 35 that extends along the inside of the deflectable fingers 32. The inner surface 35 having a draft angle of negative one degree.

As shown in FIG. 3, the canopy 14 may further include a pair of canopy ribs 37 and four v-shaped grooves 38, 39, 40, 41. The pair of canopy ribs 37 are located below the pair of receiving notches 30 and extend downward across the canopy opening 28. The pair of canopy ribs 37 are configured to indicate the proper insertion depth for the canopy lock 16 as the canopy lock 16 is inserted. An arch detail 43 extends downward in an arcuate shape between the pair of canopy ribs 37. The v-shaped grooves 38, 39, 40, 41 are configured to engage with the canopy lock 16 and prevent rotation of the canopy lock 16. FIG. 3 shows the canopy 14 with the four v-shaped grooves 38, 39, 40, 41, one on each canopy wall 34*a*, 34*b*, 34*c*, 34*d* of the canopy opening 28. Although four v-shaped grooves 38, 39, 40, 41 are shown in FIG. 3, the invention contemplates variations to the number, shape, and location of the v-shaped grooves 38, 39, 40, 41.

Figure 4:
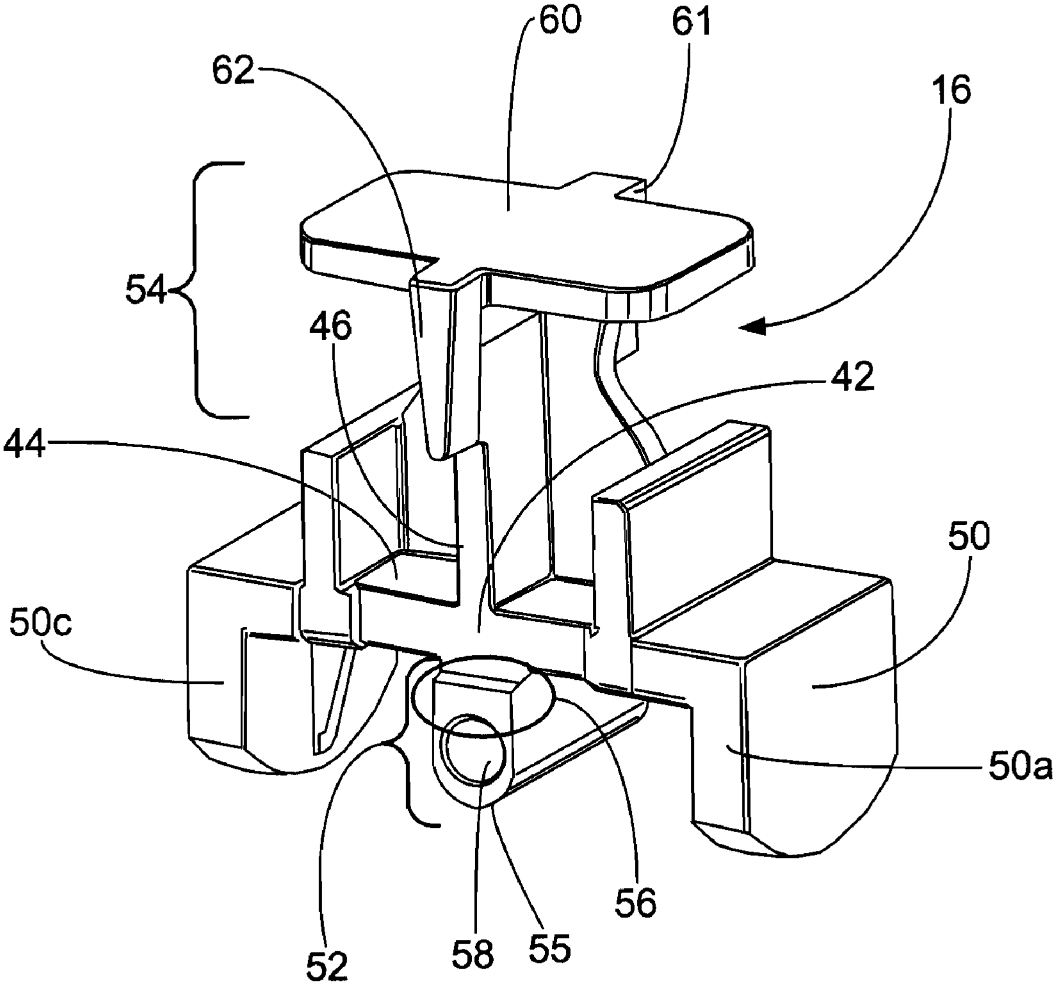
FIG. 4 shows a front view of a canopy lock of the present invention.
Figure 5:
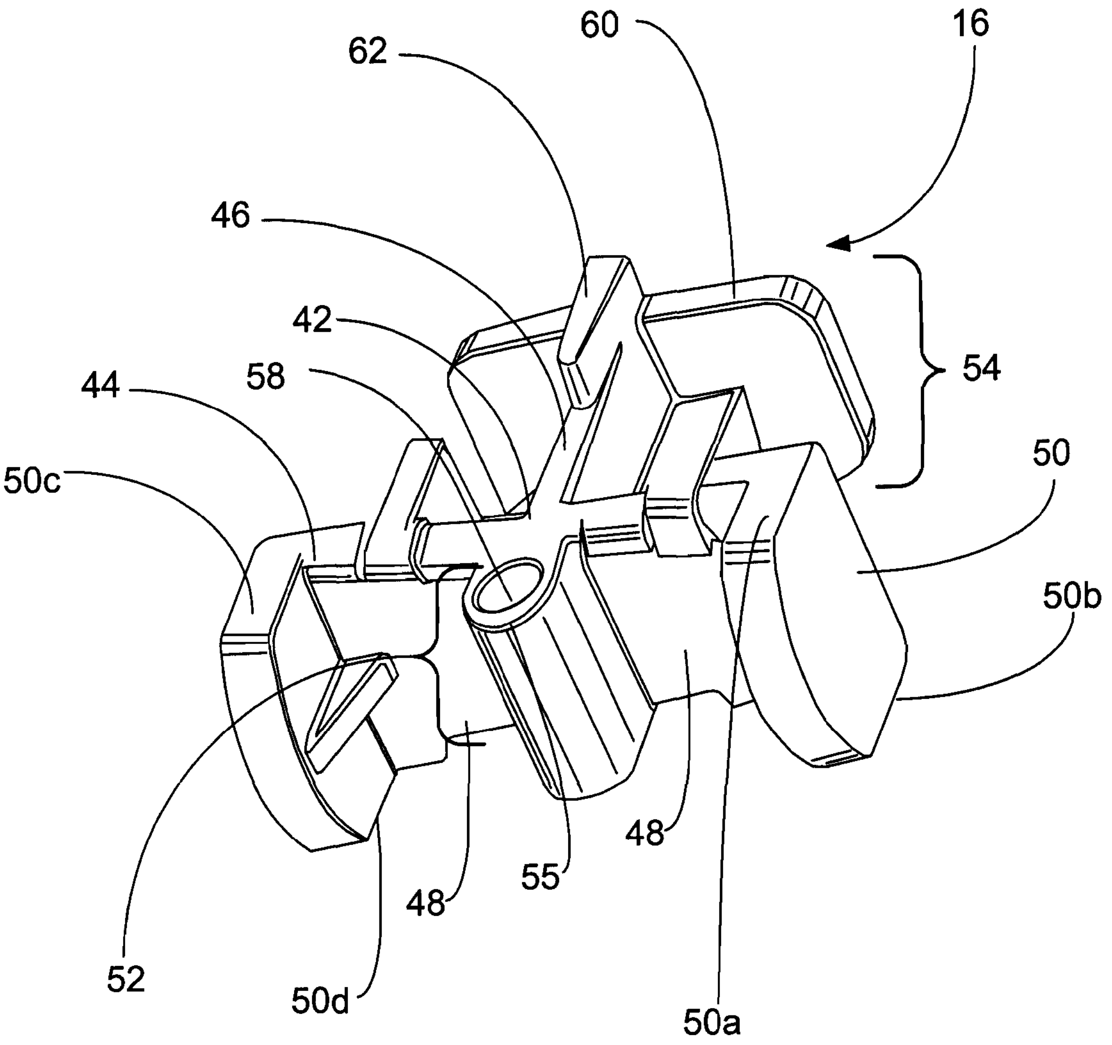
FIG. 5 shows a bottom view of a canopy lock for the lighting fixture assembly of the present invention.

FIGS. 4 and 5 show an example of the canopy lock 16 for use with the canopy 14 and the lighting fixture 12 provided herein. The canopy lock 16 is shown in plastic. The canopy lock 16 includes a T-shaped crossbar 42 with a horizontal section 44 and a vertical section 46.

The horizontal section 44 extends horizontally from the T-shaped crossbar 42 to form a planar wall 48 from the T-shaped crossbar 42. The horizontal section 44 includes two depending walls 50 extending approximately perpendicular from the planar wall 48, as shown in FIGS. 4 and 5. The T-shaped crossbar 42 is configured to lie between the two depending walls 50. Moreover, each of the depending walls 50 include two edges 50*a*, 50*b*, 50*c*, 50*d* that are configured to lie at an angle of negative one degree, making the depending wall edges 50*a*, 50*b*, 50*c*, 50*d* parallel to the inner surface 35 of the at least one pair of deflectable fingers 32. The depending wall edges 50*a*, 50*b*, 50*c*, 50*d* being substantially parallel to the deflectable fingers 32, preventing the inward deflection of the at least one pair of deflectable fingers 32 after the canopy lock 16 is inserted.

The vertical section 46 extends vertically from the T-shaped crossbar 42. The vertical section 46 includes a lower end 52 and an upper end 54. The lower end 52 includes an elliptical detail 55, at least one pair of tabs 56, and a canopy lock opening 58. The elliptical detail 55 extends downward from the lower end 52 in an elliptical shape and is configured to contact the arch detail 43 at the lowest portion of the canopy opening 28, providing a gap between the arch detail 43 and the canopy lock 16. The at least one pair of tabs 56 extend outward from a lower end 52 of the vertical section 46. The at least one pair of tabs 56 are configured to engage with the pair of receiving notches 30 of the canopy 14. The canopy lock opening 58 is circular in shape and extends through the lower end 52 of the vertical section 46.

The upper end 54 consists of a planar top surface 60 with two v-shaped ribs 61, 62 extending therefrom. The two v-shaped ribs 61, 62 are configured to be received by one of the v-shaped grooves 38, 39, 40, 41 in the canopy 14. The engagement of the two v-shaped grooves 38, 39 and the two v-shaped ribs 61, 62, shown in FIGS. 4 and 5, prevent rotation of the assembly 10 due to any sideway forces. The invention further contemplates variations to the number and location of the v-shaped ribs 61, 62 consistent with that known in the art.

Having described the components of the present invention, installation of the assembly 10 may now be described.

The assembly 10 may be installed using the following steps. First, the canopy 14 is affixed to the lighting fixture 12 by inserting the at least one pair of inwardly deflectable fingers 32 into the fixture opening 24. Next, the canopy 14 is secured to the lighting fixture by inserting a canopy lock 16 into the canopy opening 28 between the at least one pair of deflectable fingers 32 of the canopy 14 and aligning the v-shaped ribs 62 on the canopy lock 16 with the v-shaped grooves 38, 39 on the canopy 14. Then, the canopy 14 is affixed to the electrical box.

Referring to FIG. 1, the assembly 10 shown includes the lighting fixture 12; the canopy 14 having two pairs of deflectable fingers 32 and a pair of receiving notches 30; and the canopy lock 16 having the T-shaped crossbar 42 with a depending wall 50 on each side and a pair of tabs 56. The canopy 14 is attached directly to the lighting fixture 12 by inserting the deflectable fingers 32 through the fixture opening 24. The deflectable fingers 32 secure the canopy 14 to the perimetrical wall structure 22 of the lighting fixture 12. Specifically, the ledge surface 36 of the deflectable fingers 32 provide resilient securement to the perimetrical wall structure 22 of the lighting fixture 12.

After the canopy 14 is attached to the fixture 12, the canopy 14 is secured to the fixture 12 by inserting the canopy lock 16 into the canopy opening 28. As the canopy lock 16 is inserted, the depending walls 50 are aligned such that one of the depending walls 50 is disposed between each pair of deflectable fingers 32 on the canopy 14. The depending walls 50 of the canopy lock 16 prevent inward deflection of the at least one pair of deflectable fingers 32 and prevent removal of the canopy 14 from the lighting fixture 12, as shown below in FIG. 8.

Figure 6:
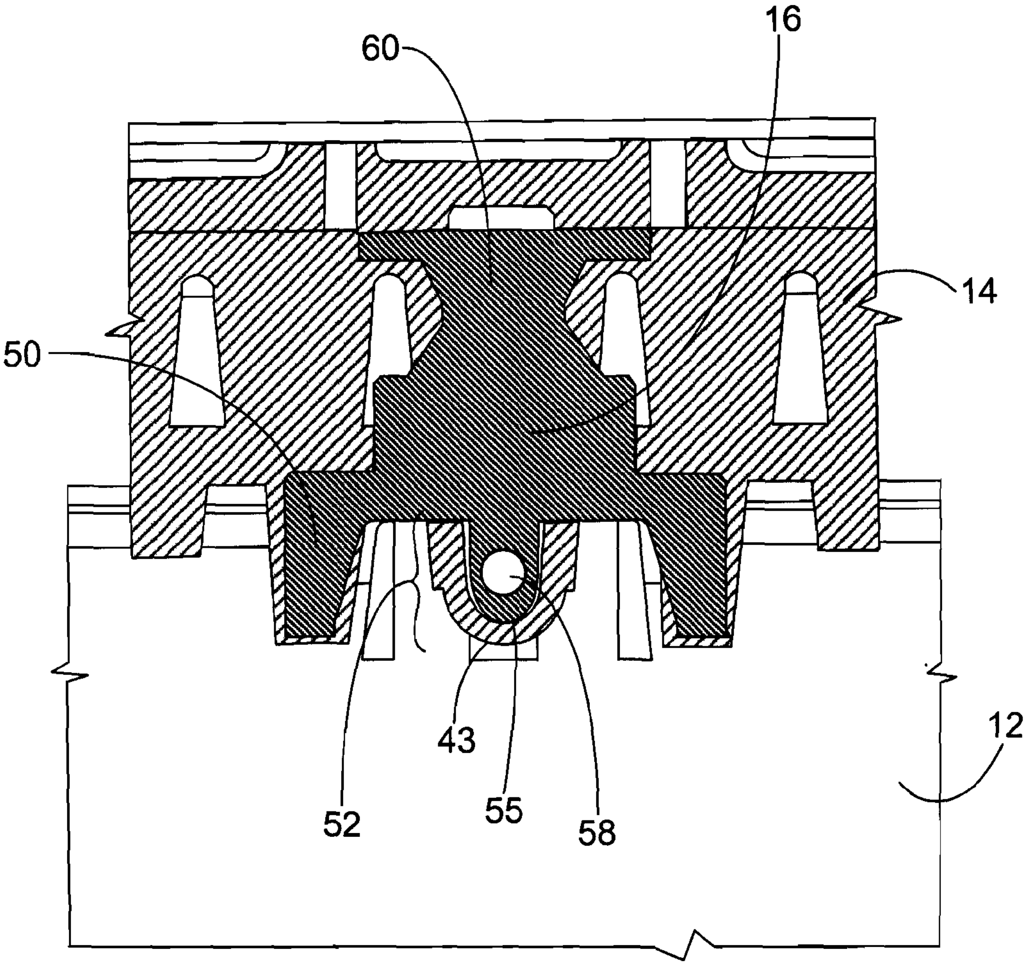
FIG. 6 shows a cross section of the lighting fixture assembly of the present invention showing the canopy lock fully inserted in the assembly.
Figure 6A:
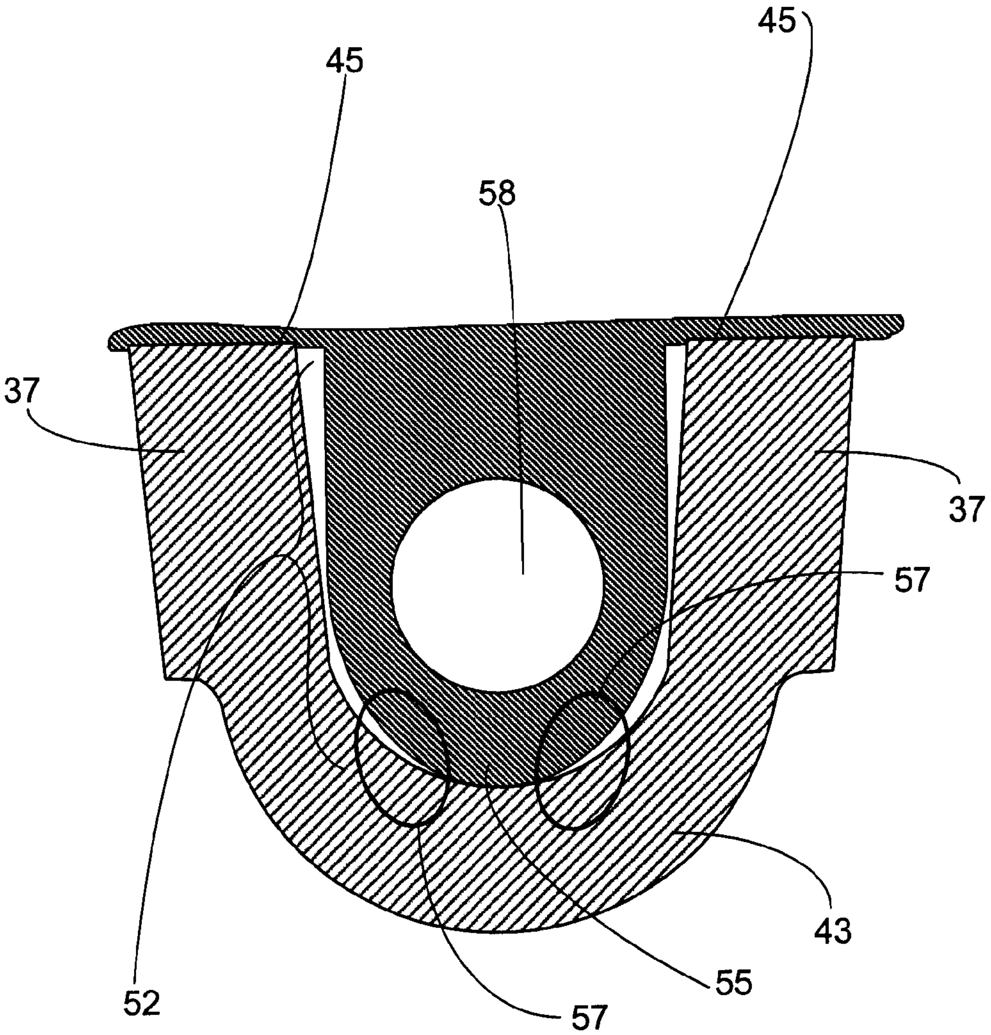
FIG. 6A shows an enlarged view of a portion of the canopy and canopy lock for the lighting fixture assembly of the present invention.

FIGS. 6 and 6A show the lower end 52 of the canopy lock 16 being inserted through the canopy opening 28 with the elliptical detail 55 contacting the arch detail 43 on the canopy 14. When the elliptical detail 55 contacts the arch detail 43, there is a gap 57 of, for example, 0.005 inches between the elliptical detail 55, which the lowest portion of the lower end 52 of the canopy lock 16, and the arch detail 43. At that same time, there is no wall gap 45 between the planar wall 48 of the horizontal section 44 of the canopy lock 16 and the pair of canopy ribs 37 on the canopy 14.

Figure 7:
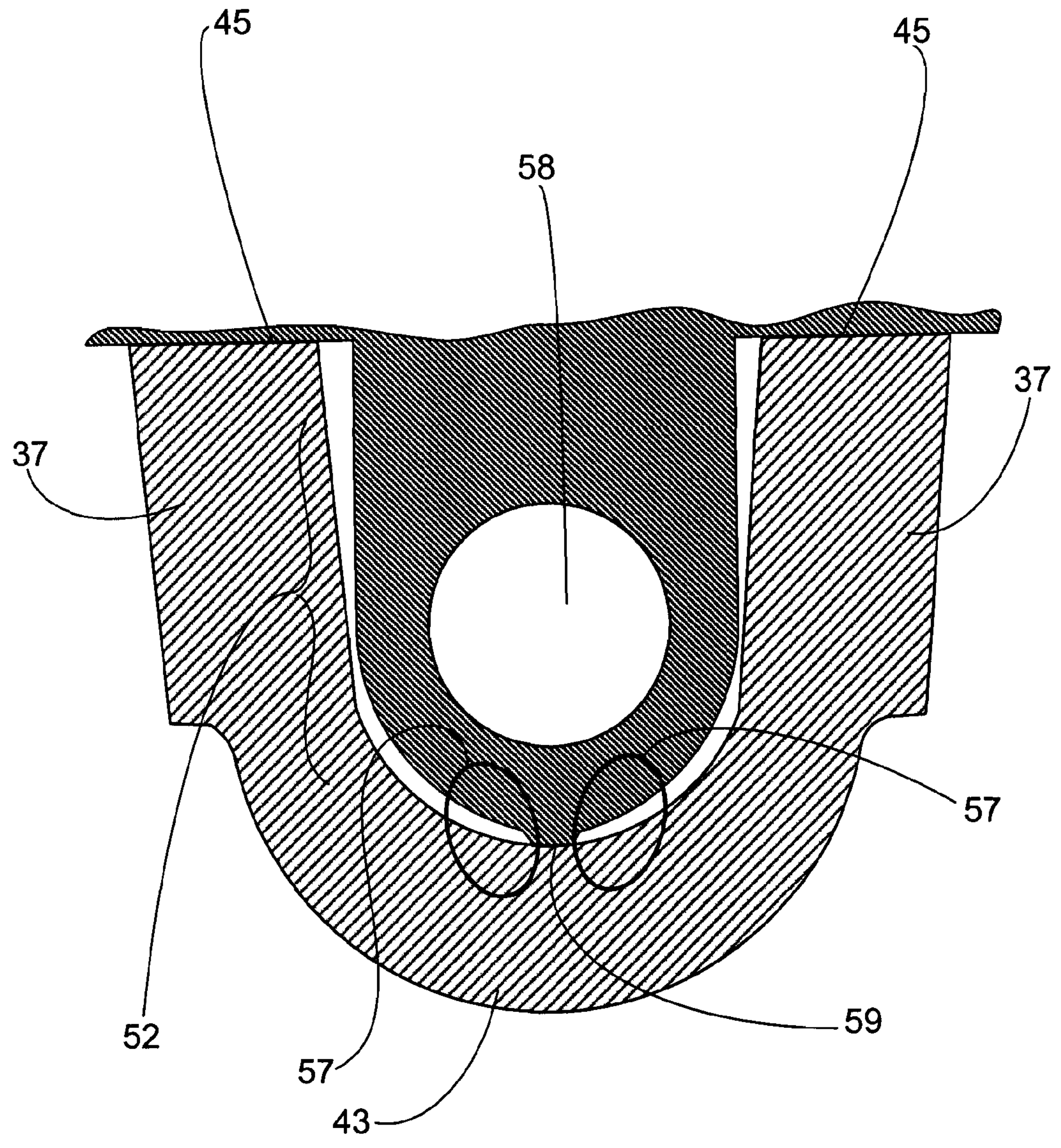
FIG. 7 shows an alternative embodiment of the canopy lock with the canopy lock shown fully inserted into the assembly.

FIG. 7 provides an alternative embodiment with a protrusion 59 being present instead of the elliptical detail 55. Similar to the elliptical detail 55, the protrusion 59 provides the gap 57 between the arch detail 43 and the canopy lock 16. As one skilled in the art will appreciate, the protrusion 59 may be used interchangeably with the elliptical detail 55.

Figure 8:
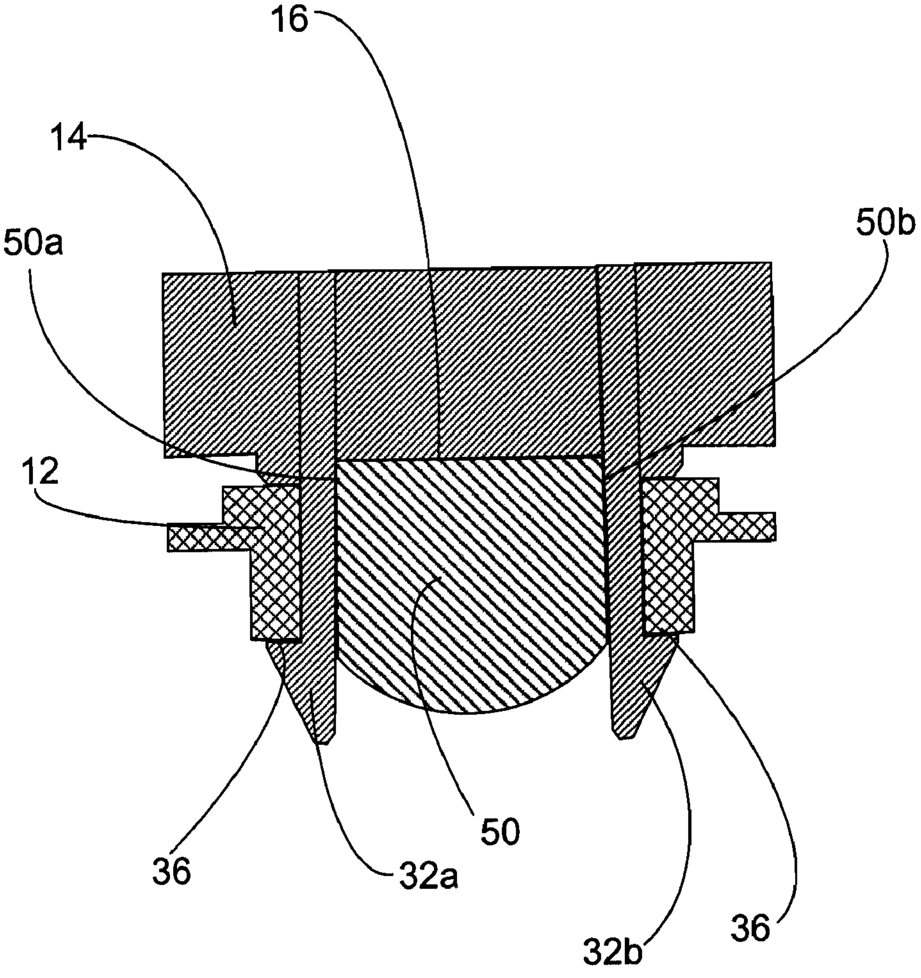
FIG. 8 shows a cross section of the lighting fixture assembly of the present invention showing a pair of deflectable fingers snapped into place and secured by the canopy lock.

FIG. 8 shows a cross section of the assembly 10 with the canopy lock 16 fully inserted into the canopy opening 28. The cross section shows one pair of deflectable fingers 32 attached to the perimetrical wall structure 22 of the lighting fixture 12 with the ledge surface 36 of the deflectable fingers 32*a*, 32*b* providing resilient securement by engaging with the perimetrical wall structure 22. One of the depending walls 50 is disposed between one pair of deflectable fingers 32*a*, 32*b* to prevent inward deflection of the fingers 32*a*, 32*b* and prevent separation of the lighting fixture 12 from the canopy 14. Since each edge 50*a*, 50*b*, 50*c*, 50*d* of the depending walls 50 are aligned at an angle of negative one degree, the depending walls 50 are configured to fit between each pair of deflectable fingers 32, but prevent inward movement of the fingers 32 once the canopy lock 16 is fully inserted.

Figure 9:
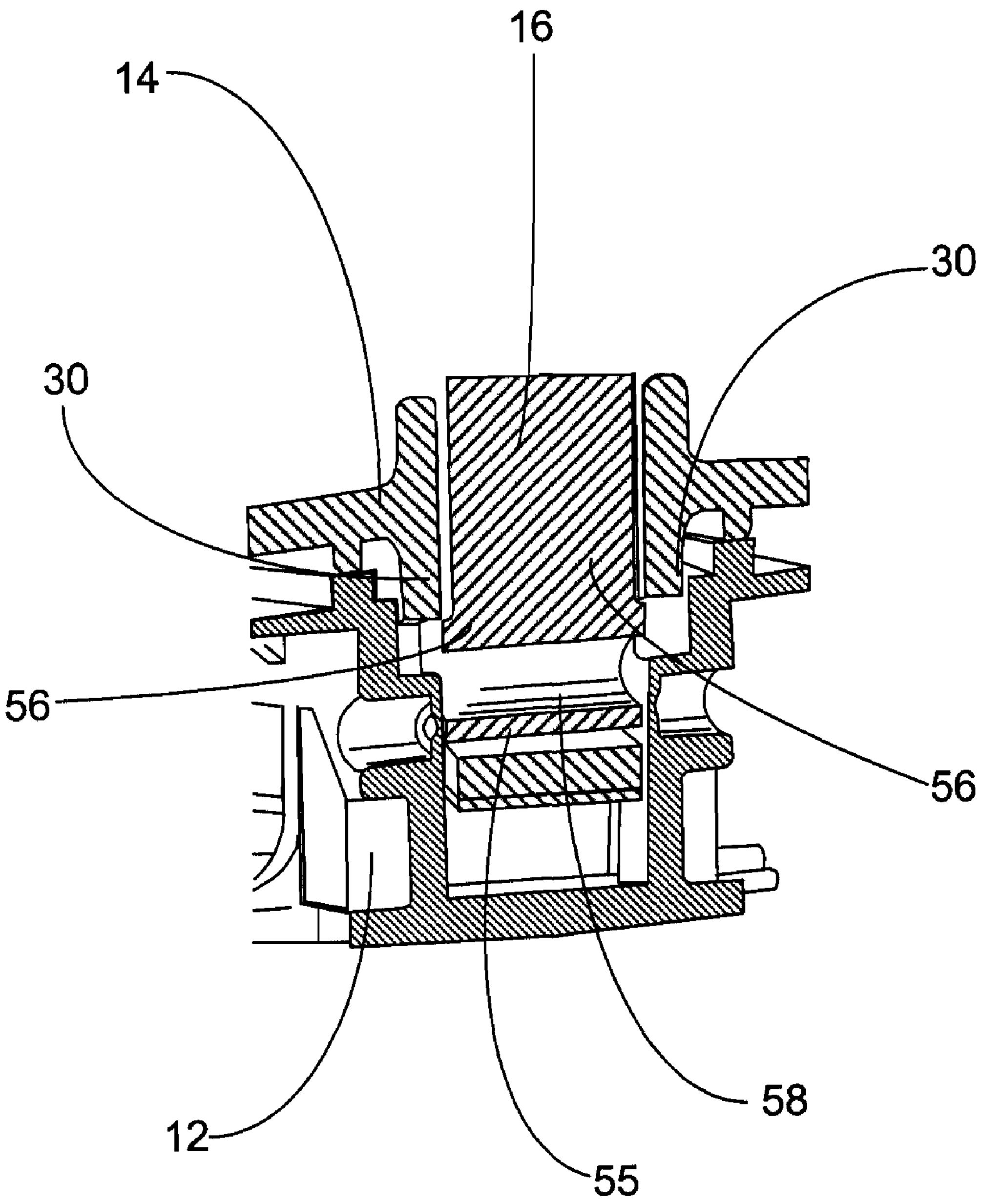
FIG. 9 shows a cross section of the lighting fixture assembly of the present invention showing the canopy lock being secured to the canopy.

In FIG. 9, a cross section of the vertical section 46 of the assembly 10 for use with an illuminating exit sign is shown. FIG. 9 shows the canopy lock 16 inserted into the canopy opening 28. The cross sectional view also shows the pair of tabs 56 of the canopy lock 16 engaging with the pair of receiving notches 30 of the canopy 14 as the canopy lock 16 is inserted.

As the canopy lock 16 is inserted, the pair of tabs 56 of the canopy lock 16 align with and engage with the pair of receiving notches 30. The pair of tabs 56 releasably snap into the pair of receiving notches 30 and each edge 50*a*, 50*b*, 50*c*, 50*d* of the depending walls 50 releasably snap into the inner surface 35 of each of the deflectable fingers 32*a*, 32*b*, 32*c*, 32*d* when the canopy lock 16 is fully inserted, providing the canopy 14 with upward restraint. After that, the assembly 10 is attached to the electrical box and mounted to a wall or ceiling in accordance with common practice.

The assembly 10 uses the canopy lock 16 to prevent the deflectable fingers 32*a*, 32*b*, 32*c*, 32*d* from collapsing inward and separating the lighting fixture 12 from the canopy 14. To remain connected to the canopy 14, the canopy lock 16 relies on the contact between the pair of receiving notches 30 on the canopy 14 and the pair of tabs 56 on the canopy lock 16, in addition, to the contact between each edge 50*a*, 50*b*, 50*c*, 50*d* of the depending walls 50 releasably snapping into the inner surface 35 of each of the deflectable fingers 32*a*, 32*b*, 32*c*, 32*d*. The assembly 10 is configured such that if and/or when there is a load applied to the assembly 10, as soon as the deflectable fingers 32 begin to deform, the load is transferred to the canopy 14 and not the canopy lock 16. Since the load is transferred to the canopy 14, the design described herein does not require the canopy lock 16 to bear the load of the lighting fixture 12.

The assembly 10 provided herein may optionally include a screw 64 for insertion through the canopy lock opening 58 to mechanically secure the lighting fixture 12 to the canopy 14. The screw 64 is typically used to provide additional upward restraint when the illuminating light fixture 12 is heavy and/or extra reinforcement is desired due to environmental conditions and unforeseeable forces.

Figure 10:
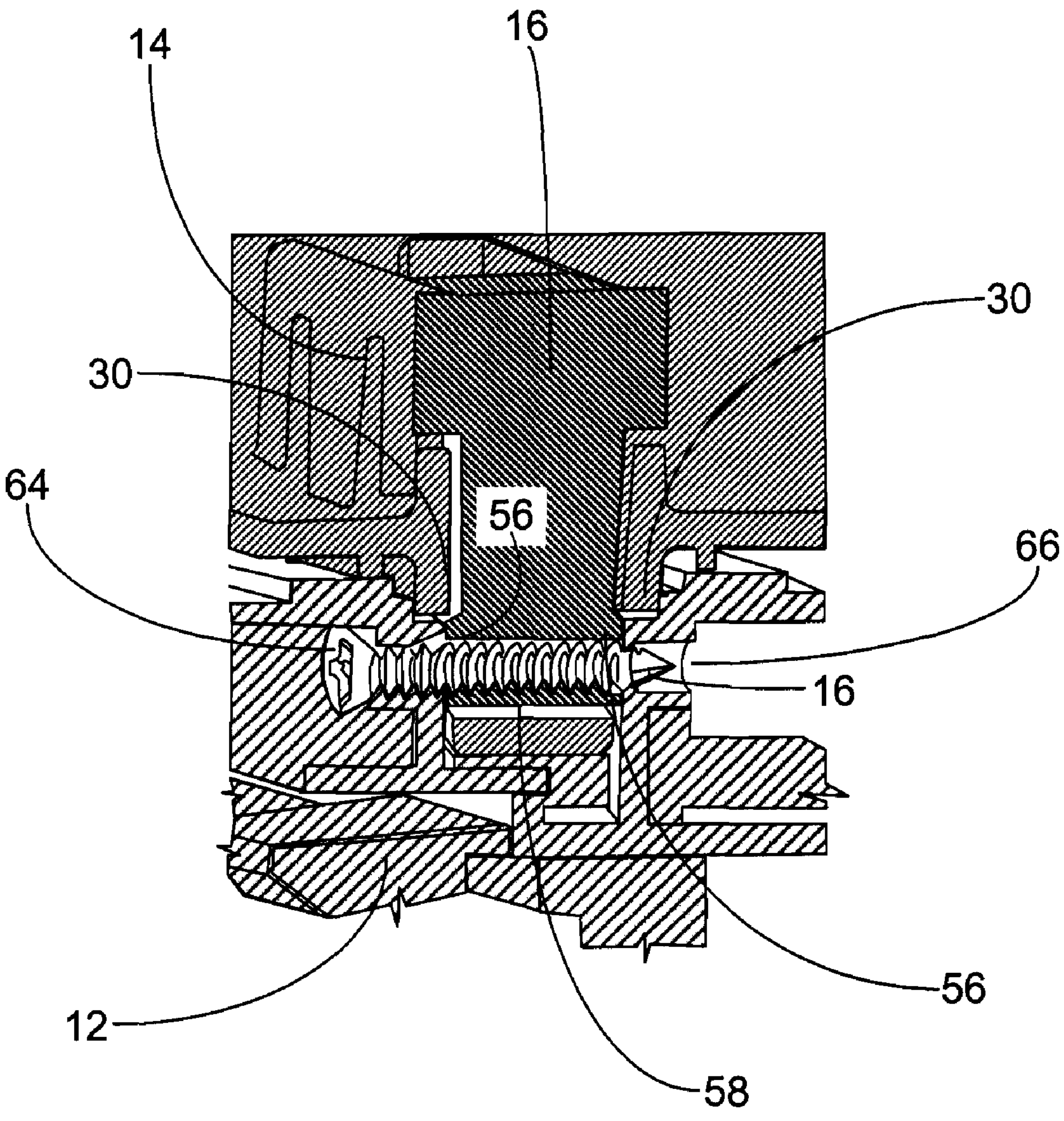
FIG. 10 shows a cross section of the lighting fixture assembly of FIG. 8 with a screw inserted therethrough.

FIG. 10 shows a cross section of the assembly 10 similar to that shown in FIG. 9 with a fixture screw aperture 66 in the lighting fixture 12. The assembly 10 of FIG. 10 is shown with an illuminated combination exit sign and emergency lighting fixture, but may also be used with an illuminating exit sign. As shown in FIG. 10, the fixture screw aperture 66 aligns with the canopy lock opening 58 to permit the canopy lock 16 to mechanically secure the lighting fixture 12 to the canopy 14 using a screw 64.

The assembly 10 uses the elliptical detail 55 or the protrusion 59 to leave a gap 57 between the arch detail 43 and the canopy lock 16. The gap 57 created by the elliptical detail 55 or protrusion 59 is limited to prevent too much movement between the canopy lock 16 and the canopy 14. Furthermore, the gap 57 is limited to a small size for instances when the screw 64 is inserted, in which case, as the deflectable fingers 32 begin to deform, the gap 57 will be reduced making the canopy lock 16 contact the canopy 14. The canopy 14 then allows the load to be directly channeled from the housing 20 to the canopy 14 through the canopy lock 16 without subjecting the canopy lock 16 to a tensile stress. Moreover, the canopy lock 16 may only be exposed to a compressive stress as the canopy lock 16 is sandwiched between the screw 64 and the canopy 14 since the screw 64 is drawn downward by the load of the lighting fixture 12. However, the canopy 14 reacts to the downward load of the lighting fixture 12 with an upward restraining force, which passes the load or weight of the lighting fixture 12 from the housing 20 to the canopy 14. Thereafter, the load is transferred to the wall or ceiling depending on where the assembly 10 is attached to the electrical box.

A benefit of the design of the canopy lock 16 is that the canopy lock 16 is removable. After the canopy lock 16 is snapped into the canopy 14, the canopy lock 16 may easily be removed to enable access to the wires, canopy 14, and/or lighting fixture 12. The canopy lock 16 may be removed by pulling the upper end 54 of the canopy lock 16 vertically and away from the canopy 14. When the canopy lock 16 is pulled vertically, the pair of tabs 56 release from the pair of receiving notches 30 and the depending walls 50*a*, 50*b*, 50*c*, 50*d* release from the deflectable fingers 32*a*, 32*b*, 32*c*, 32*d*.

The canopy lock 16, as used with the assembly 10 provided herein saves time and ensures easy and safe installation. The use of a canopy lock 16 allows the lighting fixture 12 and canopy 14 to be attached without the use of separate fastening hardware and tools, which were previously required. Since the canopy lock 16 is removable, the present invention also enables easy access to wires, even after the unit is in place.

Various changes to the foregoing described and shown structures will now be evident to those skilled in the art. Accordingly, the particularly disclosed scope of the invention is set forth in the following claims.

What is claimed:

1. A sign-type lighting fixture assembly comprising:

an illuminating lighting fixture including a housing defined by a perimetrical wall, said perimetrical wall including a fixture opening therein;

a canopy for securement to said housing of said lighting fixture, said canopy having a canopy opening for passage of electrical wires and a pair of inwardly deflectable fingers for insertion into said fixture opening for resilient securement to said perimetrical wall of said housing of said lighting fixture; and a canopy lock configured to be inserted into said canopy opening, said canopy lock being disposed between said pair of deflectable fingers of said canopy to prevent inward deflection of said fingers of said canopy to prevent removal from said lighting fixture.

2. An assembly of claim 1, wherein said canopy includes two pairs of deflectable fingers.

3. An assembly of claim 1, wherein said canopy lock further including a T-shaped crossbar with a vertical section and a horizontal section, said horizontal section having a planar wall.

4. An assembly of claim 3, wherein said canopy lock further includes at least one depending wall extending from said horizontal section of said T-shaped crossbar and configured to engage with said pair of deflectable fingers for upward restraint.

5. An assembly of claim 3, wherein said canopy further includes a pair of canopy ribs extending downward and across said canopy opening, said canopy ribs configured to engage with said planar wall of said horizontal section of said T-shaped crossbar.

6. An assembly of claim 3, wherein said T-shaped crossbar includes a pair of tabs extending outward from said vertical section of said T-shaped crossbar and configured to engage with said canopy for upward restraint.

7. An assembly of claim 3, wherein said canopy lock includes two depending walls and said T-shaped crossbar lies between said two depending walls.

8. An assembly of claim 3, wherein each of said at least one depending wall has two edges, said edges having an angle of negative one degree.

9. An assembly of claim 1, wherein said canopy further includes a pair of receiving notches configured to receive said pair of tabs and releasably snap said canopy lock into place.

10. An assembly of claim 1, wherein said canopy further includes a four v-shaped grooves and said canopy lock includes two v-shaped ribs, said v-shaped grooves are configured to receive said two v-shaped ribs when said canopy lock is fully inserted into said canopy, preventing rotation of said canopy lock.

11. An assembly of claim 1, further comprising a fixture screw aperture in said lighting fixture, wherein said fixture screw aperture partially encases said canopy and said canopy lock when said canopy lock is fully inserted into said canopy, said fixture screw aperture being configured to receive a screw and mechanically secure said light fixture to said canopy and said canopy lock.

12. The assembly of claim 1, wherein said canopy is attached to said lighting fixture, and said canopy lock is secured to said canopy opening prior to attaching said canopy to the electrical box.

13. A method of attaching a sign-type lighting fixture to an electrical box comprising:

affixing a canopy to an illuminating lighting fixture including a housing defined by a perimetrical wall, said perimetrical wall including a fixture opening therein, said canopy having a canopy opening for passage of electrical wires and at least one pair of inwardly deflectable fingers for insertion into said fixture opening for resilient securement to said perimetrical wall of said lighting fixture;

securing said canopy to said housing of said lighting fixture by inserting a canopy lock into said canopy opening between said at least one pair of deflectable fingers of said canopy to prevent inward deflection of said at least one pair of deflectable fingers of said canopy to prevent removal from said housing of said lighting fixture; and affixing said canopy to the electrical box.

14. The method of claim 13, wherein said canopy lock includes:

a T-shaped crossbar configured to be inserted into said canopy opening said T-shaped crossbar including a vertical section and a horizontal section, said horizontal section having a planar wall;

at least one depending wall extending downwards from said horizontal section of said T-shaped crossbar and configured to engage with said at least one a pair of deflectable fingers on said canopy for upward restraint; and a pair of tabs extending outward from said vertical section of said T-shaped crossbar and configured to engage with said canopy for upward restraint.

15. The method of claim 14, wherein said canopy lock secures said canopy to said illuminating lighting fixture by inserting said T-shaped crossbar into said canopy opening such that said at least one depending wall is configured to align with and engage with said pair of deflectable fingers, such that said canopy and said canopy lock interlock, restraining said canopy vertically, said canopy being attached to said lighting fixture and said canopy lock being secured to said canopy opening prior to attaching said canopy to the electrical box.

16. The method of claim 14, wherein said canopy lock includes two depending walls and said T-shaped crossbar lies between said two depending walls.

17. A method of claim 14, wherein said canopy further includes a pair of receiving notches configured to receive said pair of tabs and releasably snap said canopy lock into place.

18. A method of claim 13, further comprising inserting a screw into a fixture screw aperture in said lighting fixture, which runs through said canopy and said canopy lock, for mechanically securing said lighting fixture to said canopy and further securing said canopy lock in place.

19. A method of claim 13, wherein said canopy further includes a pair of canopy ribs extending downward and across said canopy opening, said canopy ribs configured to engage with said planar wall of said horizontal section of said T-shaped crossbar.

20. A method of claim 13, further comprising inserting two v-shaped ribs of said canopy lock into two v-shaped grooves of said canopy, said two v-shaped grooves are configured to receive said two v-shaped ribs when said canopy lock is fully inserted into said canopy, preventing rotation of said canopy lock.

* * * * *